(12) United States Patent
Ro et al.

(10) Patent No.: US 7,446,826 B2
(45) Date of Patent: Nov. 4, 2008

(54) DISPLAY PANEL AND METHOD OF MANUFACTURE

(75) Inventors: Sung-In Ro, Gunpo-si (KR); Sang-Woo Park, Seoul (KR); Dae-Cheol Kim, Suwon-si (KR); Hyun-Young Kim, Suwon-si (KR)

(73) Assignee: Samsung Electronics, Co., Ltd., Kyungki-do (KR)

( * ) Notice: Subject to any disclaimer, the term of this patent is extended or adjusted under 35 U.S.C. 154(b) by 308 days.

(21) Appl. No.: 11/476,316

(22) Filed: Jun. 27, 2006

(65) Prior Publication Data

US 2006/0290838 A1    Dec. 28, 2006

(30) Foreign Application Priority Data

Jun. 27, 2005    (KR) .................. 10-2005-0055682

(51) Int. Cl.
*G02F 1/1333* (2006.01)
*G02F 1/1339* (2006.01)

(52) U.S. Cl. .................. 349/60; 349/153; 349/155

(58) Field of Classification Search ............... 349/56, 349/60, 82, 153–156
See application file for complete search history.

(56) References Cited

U.S. PATENT DOCUMENTS

2005/0140913 A1 *   6/2005   Yokota et al. ............... 349/153
2005/0219456 A1 *  10/2005   Tadaki et al. ............... 349/156

* cited by examiner

*Primary Examiner*—Hemang Sanghavi
(74) *Attorney, Agent, or Firm*—MacPherson Kwok Chen & Heid LLP; Tom Chen (57) ABSTRACT

A display panel includes a first substrate, a second substrate, a connecting member and a strength-reinforcing member. The second substrate faces the first substrate, and includes a display area and a peripheral area surrounding the display area. The connecting member is disposed in the peripheral area to electrically connect the first substrate and the second substrate. The strength-reinforcing member protrudes from the second substrate and is disposed inside the connecting member. Thus, the strength-reinforcing member increases strength of the connecting member and stabilizes electrical connection between the first and second substrates, thereby improving display quality of a display device having the display panel.

15 Claims, 13 Drawing Sheets

FIG. 6

DISPLAY PANEL AND METHOD OF MANUFACTURE

CROSS-REFERENCE TO RELATED APPLICATION

This application relies for priority upon Korean Patent Application No. 2005-55682 filed on Jun. 27, 2005, the contents of which are herein incorporated by reference in its entirety.

FIELD OF THE INVENTION

The present invention relates to a display panel, a method of manufacturing the display panel and a liquid crystal display device having the display panel. More particularly, the present invention relates to a display panel capable of improved display quality and a method of manufacturing the display panel.

DESCRIPTION OF THE RELATED ART

Generally, a liquid crystal display (LCD) device includes a thin film transistor (TFT) substrate, a color filter substrate facing the TFT substrate and a liquid crystal layer disposed between the TFT substrate and the color filter substrate to determine optical transmissivity in response to externally applied electrical signals. The TFT substrate includes a matrix of pixels, gate lines, data lines, and TFTs electrically connected to the gate and data lines. Scan signals are applied to the TFTs via the gate lines to drive the TFTs so that the image signals from the data lines are coupled to the pixel electrodes. A sealant is printed on a peripheral portion of the color filter substrate to form a seal line that surrounds the color filter. The TFT substrate and the color filter substrate are firmly coupled to each other by the seal line.

After printing the sealant, the color filter substrate is electrically connected to the TFT substrate to provide a common voltage input via the TFT substrate to the common electrode of the color filter substrate. Some of the connection points have a conductive material are formed to overlap the seal line while others are formed outside the seal line. A predetermined pressure is then applied to the color filter substrate and the TFT substrate. Ultraviolet light is used to cure the seal line to firmly attach together the TFT substrate and the color filter substrate. Since the connection points have relatively little elasticity compared with the seal line, they undergo a stress through the above processes which results in the connection points cracking under the stress.

SUMMARY OF THE INVENTION

According to the present invention, the display panel includes a first substrate, a second substrate, a connecting member and a strength-reinforcing member. The second substrate faces the first substrate and includes a display area and a peripheral area surrounding the display area. The connecting member is disposed in the peripheral area to electrically connect the first substrate and the second substrate. The strength-reinforcing member protrudes from the second substrate and is disposed inside the connecting member. Locating the strength-reinforcing member inside the connecting member increases the strength of the connecting member and stabilizes the electrical connection between the first and second substrates, thereby improving the display quality

BRIEF DESCRIPTION OF THE DRAWINGS

The above and other features and advantage points of the present invention will become more apparent from a reading of the detailed description with reference to the accompanying drawings, in which:

FIGS. 4A to 4E are cross-sectional views illustrating a method of forming the upper substrate of the liquid crystal display panel illustrated in FIG. 1;

FIGS. 5A to 5D are cross-sectional views illustrating a method of forming the upper substrate of the liquid crystal display panel illustrated in FIG. 3.

DESCRIPTION

In the drawings, the thickness of layers and regions are exaggerated for clarity. Like reference numerals refer to similar or identical elements throughout. It will be understood that when an element such as a layer, region or substrate is referred to as being "on" or "onto" another element, it may be directly on the other element or intervening elements may also be present.

Figure 1:
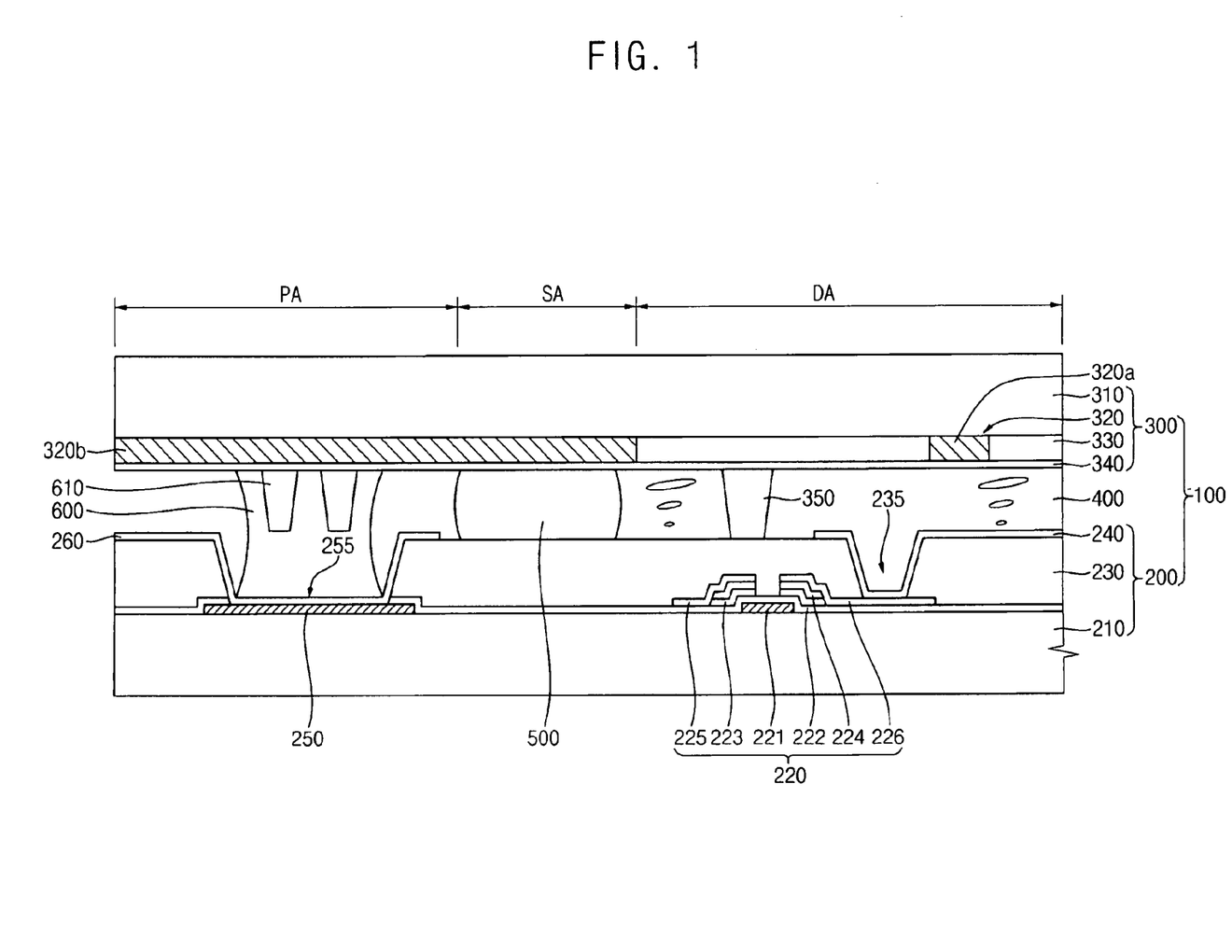
FIG. 1 is a cross-sectional view illustrating a liquid crystal display panel according to an example embodiment of the present invention.
Figure 2:
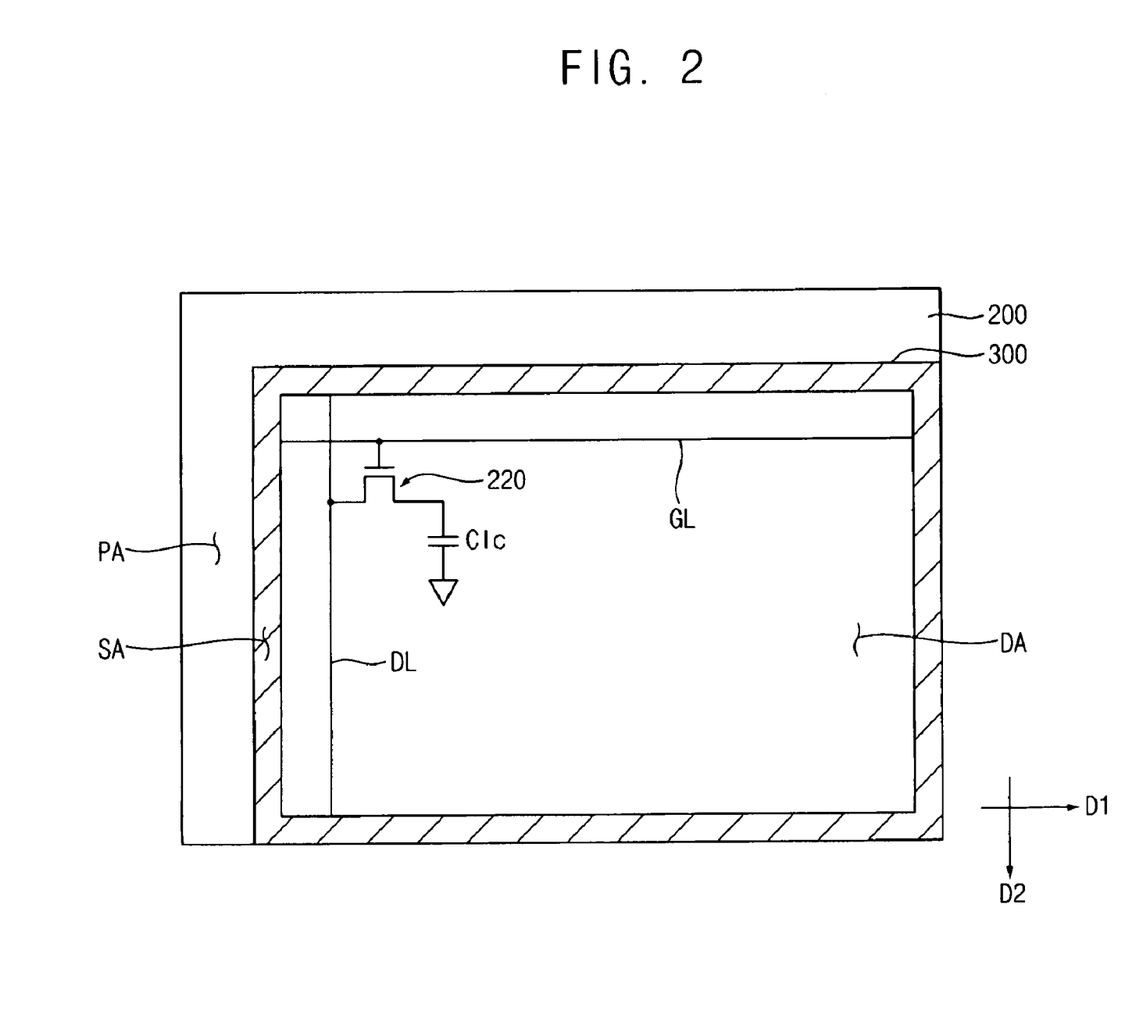
FIG. 2 is a plan view illustrating the liquid crystal display panel illustrated in FIG. 1.

FIG. 1 is a cross-sectional view illustrating a liquid crystal display panel according to an example embodiment of the present invention. FIG. 2 is a plan view illustrating the liquid crystal display panel illustrated in FIG. 1. Referring to FIGS. 1 and 2, a liquid crystal display (LCD) panel 100 according to the present invention includes a lower substrate 200, an upper substrate 300 facing the lower substrate 200, a liquid crystal layer 400 disposed between the lower and upper substrates 200 and 300 and a seal line coupling the lower and upper substrates 200 and 300 to each other.

The LCD panel 100 includes a display area DA where an image is displayed, a seal line area SA surrounding the display area DA and a peripheral area PA outside the seal line area SA. A plurality of gate lines GL and a plurality of data lines DL are formed on a portion of a first substrate 210 corresponding to the display area DA. The gate lines GL and the data lines DL extend in a first direction D1 and a second direction D2 that is substantially perpendicular to the first direction D1, respectively. A plurality of pixel regions is defined by two adjacent gate lines and two adjacent data lines.

A thin film transistor (TFT) 220 is formed on a portion of a first substrate 210 corresponding to each of the pixel regions. The TFT 220 includes a gate electrode 221 extending from one of the gate lines GL, a source electrode 225 extending from one of the data lines DL, and a drain electrode 226 spaced apart from the source electrode. The TFT 220 further includes a gate insulation layer 222 formed on the gate electrode 221, a semiconductor layer 223 and an ohmic contact layer 224.

A gate insulation layer 222 is formed on the first substrate 210 having the gate electrode 221, the source electrode 225 and the drain electrode 226. The gate insulation layer 222 includes, for example, silicon nitride ($SiN_x$). A semiconductor layer 223 is formed on the gate insulation layer 222, and the ohmic contact layer 224 is formed on the semiconductor layer 223. The semiconductor layer 223 includes amorphous silicon (a-Si), and the ohmic contact layer 224 includes n+amorphous silicon (n+a-Si) having n-type impurities highly doped therein. The ohmic contact layer 224 is partially removed to expose the semiconductor layer 223.

An organic layer 230 is formed on the TFT 220 that is formed on a portion of the first substrate 210 corresponding to the display area DA. The organic layer 230 has a contact hole 235 that partially exposes the drain electrode 226 of the TFT 220. A pixel electrode 240 that is transparent is formed on the organic layer 230. The pixel electrode 240 includes a transparent conductive material. The pixel electrode 240 includes, for example, indium zinc oxide (IZO) or indium tin oxide (ITO). The pixel electrode 240 is electrically connected to the drain electrode 226 of the TFT 220 through the contact hole 235.

A seal line 500 is formed on a portion of the first substrate 210 corresponding to the seal line area SA to attach the lower substrate 200 and the upper substrate 300. The seal line 500 may include light curable material. Thus, the lower substrate 200 and the upper substrate 300 are firmly attached to each other.

A common voltage electrode pad 250 is formed on a portion of the first substrate 210 corresponding to the peripheral area PA to provide a common voltage Vcom to the LCD panel 100. The common voltage electrode pad 250 may include substantially the same material as the gate electrode 221 of the TFT 220, and may be simultaneously formed with the gate electrode 221 of the TFT 220. Alternatively, the common voltage electrode pad 250 may be simultaneously formed with the source electrode 225 of the TFT 220 and the drain electrode 226 of the TFT 220.

A through hole 255 is formed on a portion of the first substrate 210 corresponding to the peripheral area PA to partially expose the common voltage electrode pad 250. To form the through hole 255 the gate insulation layer 222 and the organic layer 230 deposited on the common voltage electrode pad 250 are partially removed. A transparent electrode 260 is formed on the common voltage electrode pad 250 to be electrically connected to the common voltage electrode pad 250 through the hole 255. The transparent electrode 260 may include substantially the same material as the pixel electrode 240, and may be simultaneously formed with the pixel electrode 240. Thus, the transparent electrode 260 may include ITO or IZO.

The upper substrate 300 includes a second substrate 310, and further includes a light-blocking layer 320, a color filter 330, a common electrode 340 and a cell gap maintaining member (hereinafter referred to as "column spacer") 350, which are formed on the second substrate 310. The light-blocking layer 320 includes a first light-blocking pattern 320a and a second light-blocking pattern 320b. The first light-blocking pattern 320a is formed on the second substrate 310 corresponding to the display area DA in a matrix shape. The first light-blocking pattern 320a prevents light from leaking between the pixel regions. The second light-blocking pattern 320b is formed on the second substrate 310 corresponding to the seal line area SA and the peripheral area PA in a matrix shape.

The color filter 330 is formed on the display area DA of the second substrate 310 having the light-blocking layer 320. The color filter 330 includes a red (R) color pixel, a green (G) color pixel and a blue (B) color pixel. End portions of the R, G and B color pixels may partially overlap the light-blocking layer 320. The common electrode 340 is formed on a substantially entire portion of the second substrate 310 having the color filter 330 and has a substantially uniform thickness.

Column spacer 350 is formed on the common electrode 340. The column spacer 350 has a circular truncated cone shape that has a small diameter at a portion near the organic layer 230. The column spacer 350 is formed on the second substrate corresponding to the TFT 220, thereby having no effect on an opening ratio of the LCD panel 100. The column spacer 350 may include an organic material.

The upper substrate 300 further includes a connecting member (hereinafter referred to as "short point") 600 and a strength-reinforcing member 610. The short point 600 is formed on the second substrate 310 corresponding to the peripheral area PA. The short point 600 corresponds to the common voltage electrode pad 250.

The short point 600 includes a paste in which a conductive particle is included. When coupling the lower substrate 200 to the upper substrate 300, the conductive particle of the short point 600 makes contact with the transparent electrode 260. Thus, the externally provided common voltage Vcom via the common voltage electrode pad 250 is applied to the common electrode 340 of the upper substrate 300 through the short point 600. Therefore, the short point 600 electrically connects the upper substrate 300 to the lower substrate 200.

The strength-reinforcing member 610 corresponds to the short point 600. The strength-reinforcing member 610 protrudes from the second substrate 310 into the short point 600. The strength-reinforcing member 610 is formed inside the short point 600. Particularly, the strength-reinforcing member 610 is formed on a portion of the second substrate 310 corresponding to the peripheral area PA, and then the paste having the conductive particle is sprayed into the peripheral area PA having the strength-reinforcing member 610 to form the short point 600. Thus, the strength-reinforcing member 610 is formed inside the short point 600.

The strength-reinforcing member 610 may include substantially the same material as the column spacer 350, and may be simultaneously formed with the column spacer 350. The strength-reinforcing member 610 has substantially the same shape and height as the column spacer 350. In FIG. 1, the LCD panel 100 includes two strength-reinforcing members 610. Alternatively, the LCD panel 100 may include one or more than two strength-reinforcing members 610.

As described above, the strength-reinforcing member 610 is formed inside the short point 600 and thus the short point 600 has a reinforced strength, thereby preventing the LCD panel 100 from being cracked due to externally applied vibration or impact.

Figure 3:
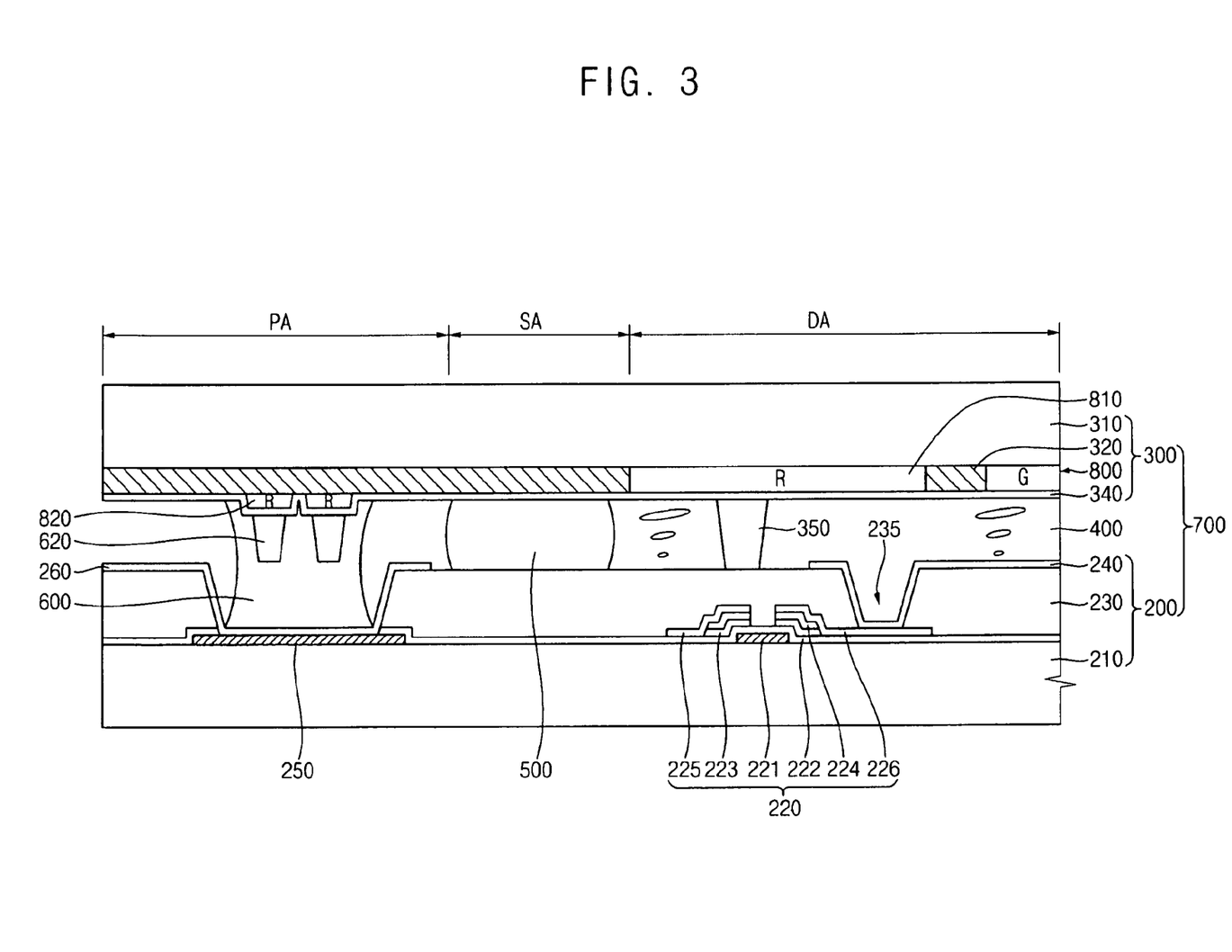
FIG. 3 is a cross-sectional view illustrating a liquid crystal display panel according to another example embodiment of the present invention.

FIG. 3 is a cross-sectional view illustrating a liquid crystal display panel according to another example embodiment of the present invention.

Referring to FIG. 3, an LCD panel 700 according to another example embodiment of the present invention includes a lower substrate 200, an upper substrate 300 and a liquid crystal layer 400 between the lower and upper substrates 200 and 300. Here, substantially the same elements as in FIG. 1 will be represented by the same reference numerals, and any further description for the elements will be omitted.

The upper substrate 300 includes a second substrate 310, a color filter 800 and a strength-reinforcing member 620, the color filter 800 and the strength-reinforcing member 620 being formed on the second substrate 310. The color filter 800 includes a first color filter portion 810 and a second color filter portion 820. The first color filter portion 810 is formed on a portion of the second substrate 310 corresponding to the display area DA. The first color filter portion 810 includes a red (R) color pixel, a green (G) color pixel and a blue (B) color pixel.

The second color filter portion 820 is formed on a portion of the second substrate 310 corresponding to the peripheral area PA. The second color filter portion 820 is simultaneously formed with the first color filter portion 820. The second color filter portion 820 includes at least one of a red (R) color pixel, a green (G) color pixel and a blue (B) color pixel. In FIG. 3, the second color filter portion 820 includes the R color pixel. Alternatively, the second color filter portion 820 may include the G color pixel or the B color pixel. Alternatively, the second color filter portion 820 may include the R, G and B color pixels.

The strength-reinforcing member 620 is formed on the second color filter portion 820. The strength-reinforcing member 610 and the second color filter portion 820 are formed inside the short point 600. Particularly, the second color filter portion 820 and the strength-reinforcing member 610 are successively formed on a portion of the second substrate 310 corresponding to the peripheral area PA, and then the paste having the conductive particle is sprayed into the peripheral area PA having the second color filter portion 820 and the strength-reinforcing member 610 to form the short point 600. Thus, the second color filter portion 820 and the strength-reinforcing member 610 are formed inside the short point 600. The second color filter portion 820 and the strength-reinforcing member 610 increase strength of the short point 600. Since the strength-reinforcing member 610 is formed on the second color filter portion 820, the strength-reinforcing member 610 is formed at a position higher than the formation position shown in FIG. 1.

Since the strength of the short point 600 increases as the position of the strength-reinforcing member becomes high, the strength of the short point 600 is greater than the strength of the short point 600 shown in FIG. 1. Thus, the LCD panel 700 is prevented from being cracked due to externally applied vibration or impact.

Figure 4A:
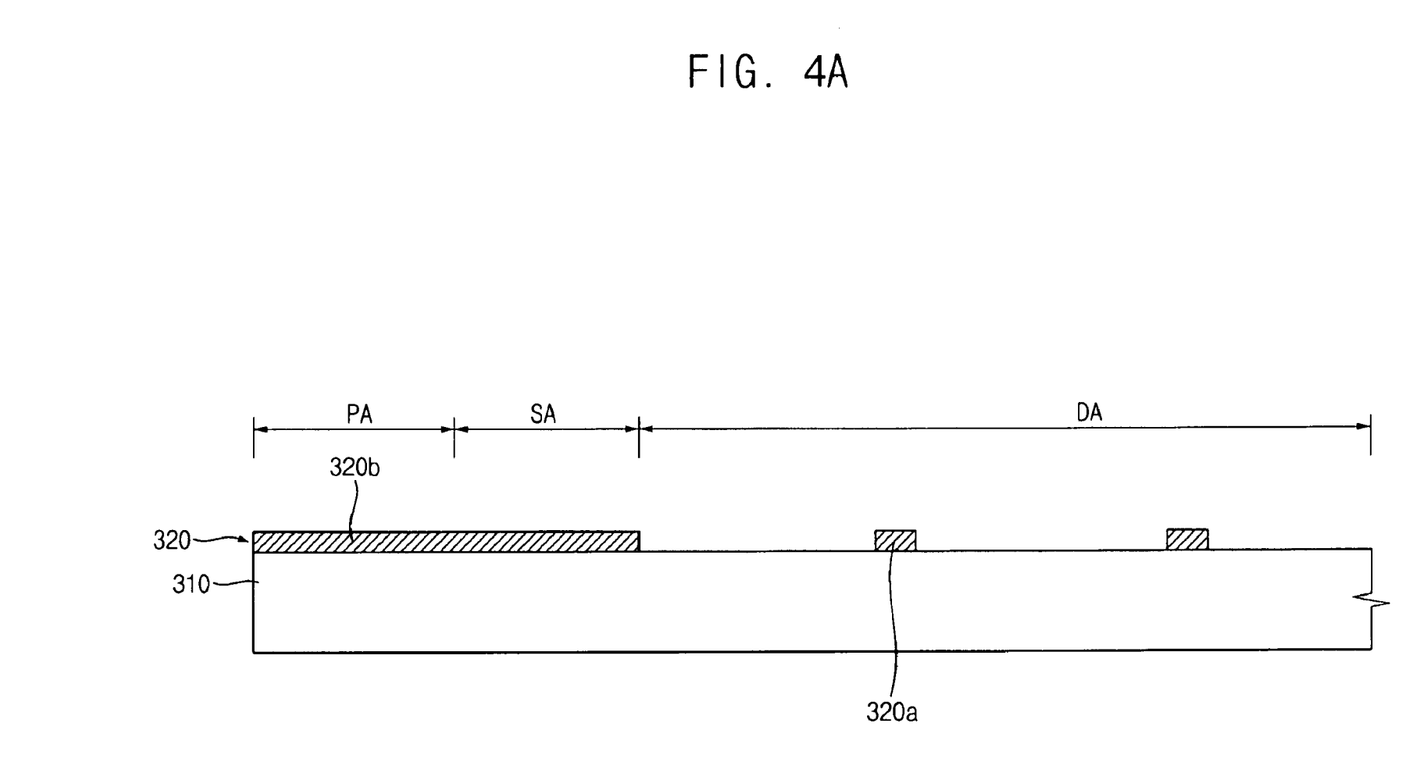

FIGS. 4A to 4E are cross-sectional views illustrating a method of forming the upper substrate of the liquid crystal display panel illustrated in FIG. 1. Referring to FIG. 4A, a material layer is deposited on an entire surface of the second substrate 310 and patterned to form the light-blocking layer 320. The light-blocking layer 320 includes the first light-blocking pattern 320a formed in the display area DA and the second light-blocking pattern 320b formed in the peripheral area PA. The first light-blocking pattern 320a is formed in a matrix shape, and the second light-blocking pattern 320b is formed to surround the display area DA.

Figure 4B:
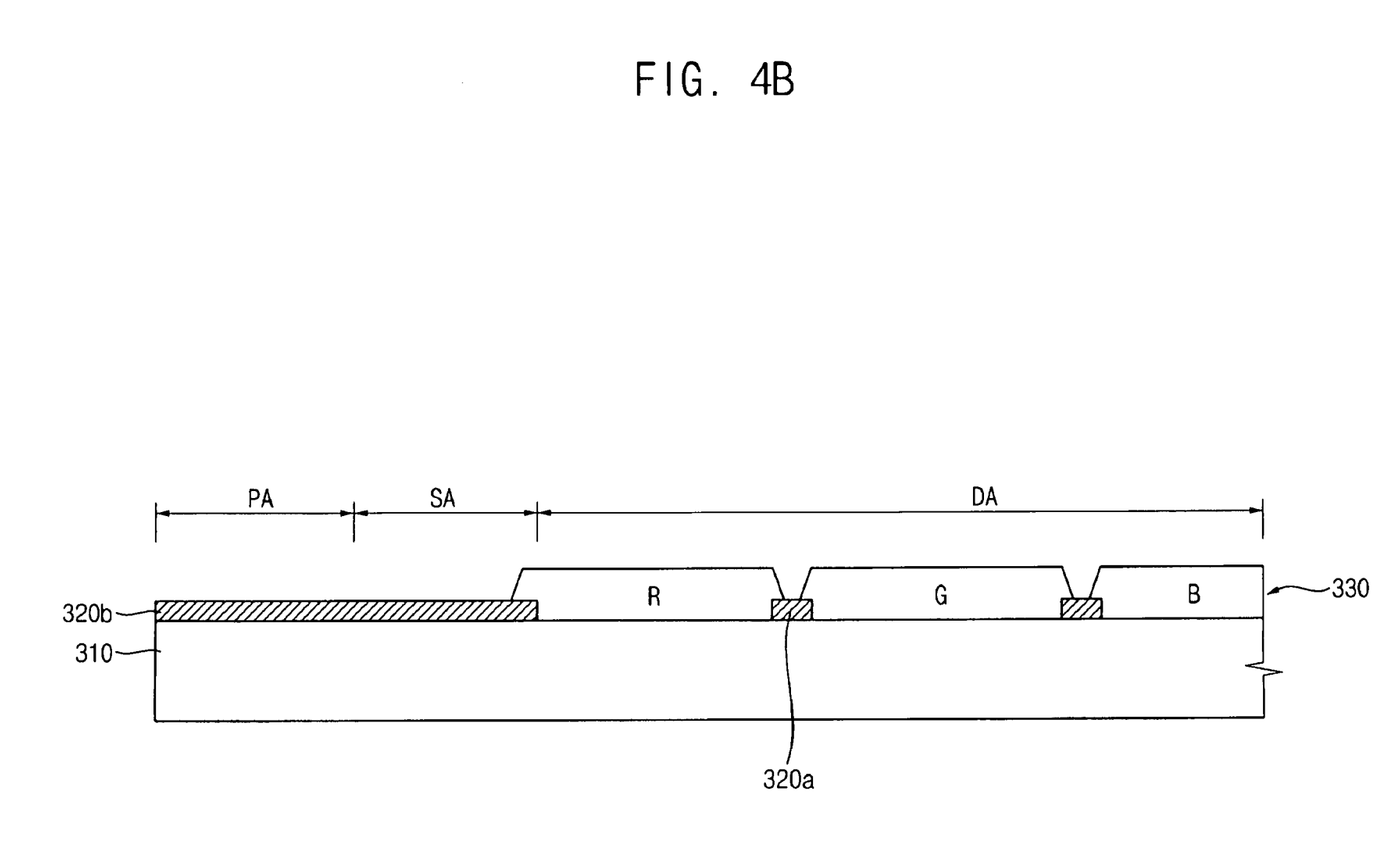

Referring to FIG. 4B, a first photoresist (not shown) including a red dye or pigment is formed on the second substrate 310 having the light-blocking layer 320 in a uniform thickness. Then, the first photoresist is patterned to form the red (R) color pixel.

Then, a second photoresist (not shown) including a green dye or pigment is formed on the second substrate 310. Then, the second photoresist is patterned to form the green (G) color pixel.

Thereafter, a third photoresist (not shown) including a blue dye or pigment is formed on the second substrate 310. Then, the third photoresist is patterned to form the blue (B) color pixel. Therefore, the color filter 330 including the R, G and B color pixels is completely formed on the second substrate 310. In one example embodiment of the present invention, end portions of each of the R, G and B color pixels overlap with the light-blocking layer 320.

Figure 4C:
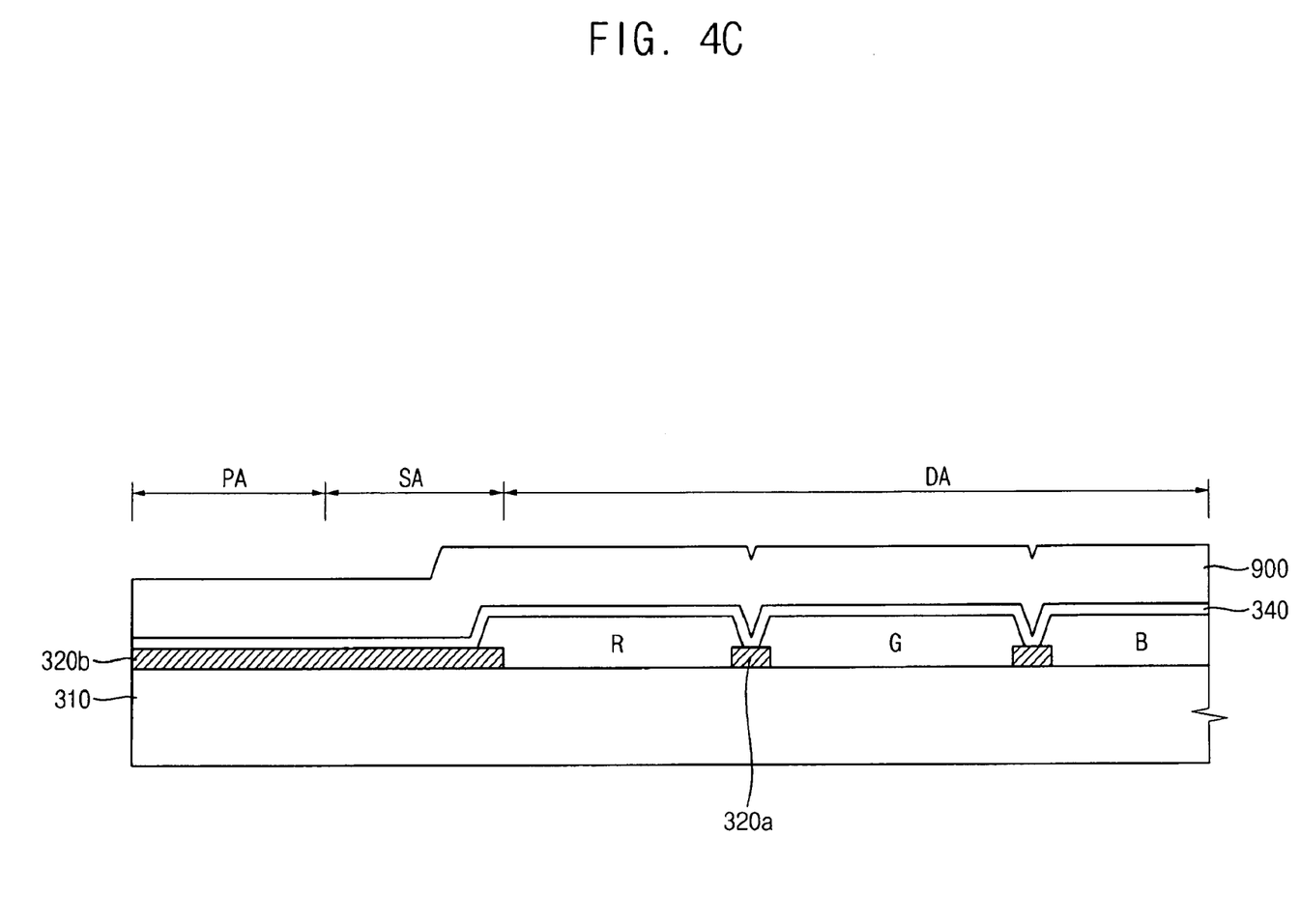

Referring to FIG. 4C, a transparent conductive layer including, for example, ITO or IZO is deposited on the second substrate 310 having the color filter 330 in a uniform thickness to form the common electrode 340. The common electrode 340 faces the pixel electrode 240 of the lower substrate 200. For example, a planarizing layer (not shown) may be formed between the color filter 330 and the common electrode 340 to planarize the upper substrate 300.

Then, an organic layer 900 is formed on the second substrate 310 having the common electrode 340 in a uniform thickness. The organic layer 900 includes, for example, a negative photoresist. A portion of the negative photoresist, which is exposed to light, is not developed through a developing process. Alternatively, the organic layer 900 may include a positive photoresist. A portion of the positive photoresist, which is exposed to light, is developed through a developing process.

Figure 4D:
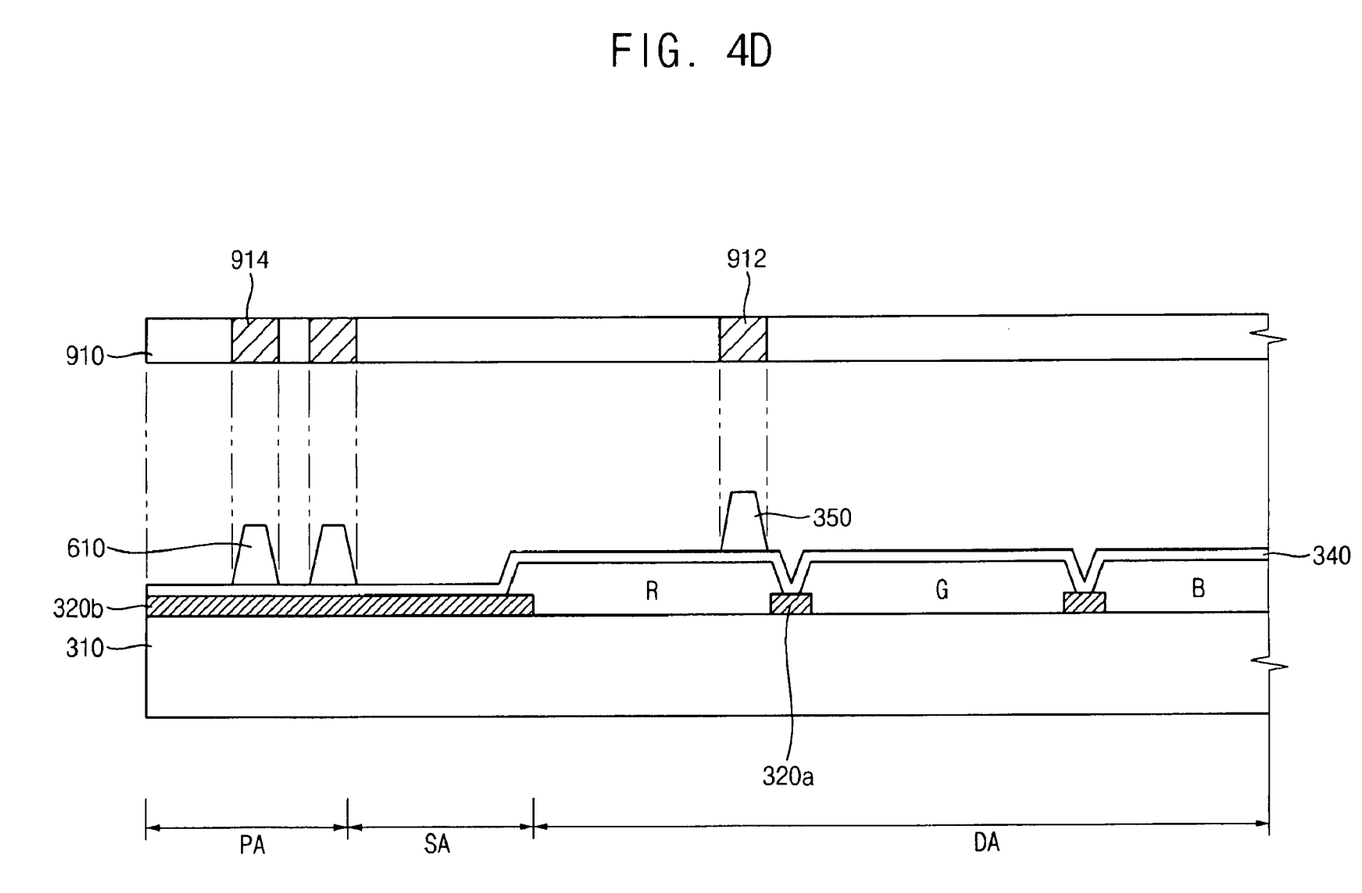

Referring to FIG. 4D, the organic layer 900 is patterned using a mask 910 positioned over the second substrate 310 having the organic layer 900 to form the column spacer 350 and the strength-reinforcing member 610. The mask 910 has a first opening 912 corresponding to the column spacer 350 and a second opening 914 corresponding to the strength-reinforcing member 610.

The organic layer 900 is exposed to light and developed using the mask 910 having the first opening 912 and the second opening 914 to simultaneously form the column spacer 350 and the strength-reinforcing member 610. The column spacer 350 is formed in the display area DA, and the strength-reinforcing member 610 is formed in the peripheral area PA.

Figure 4E:
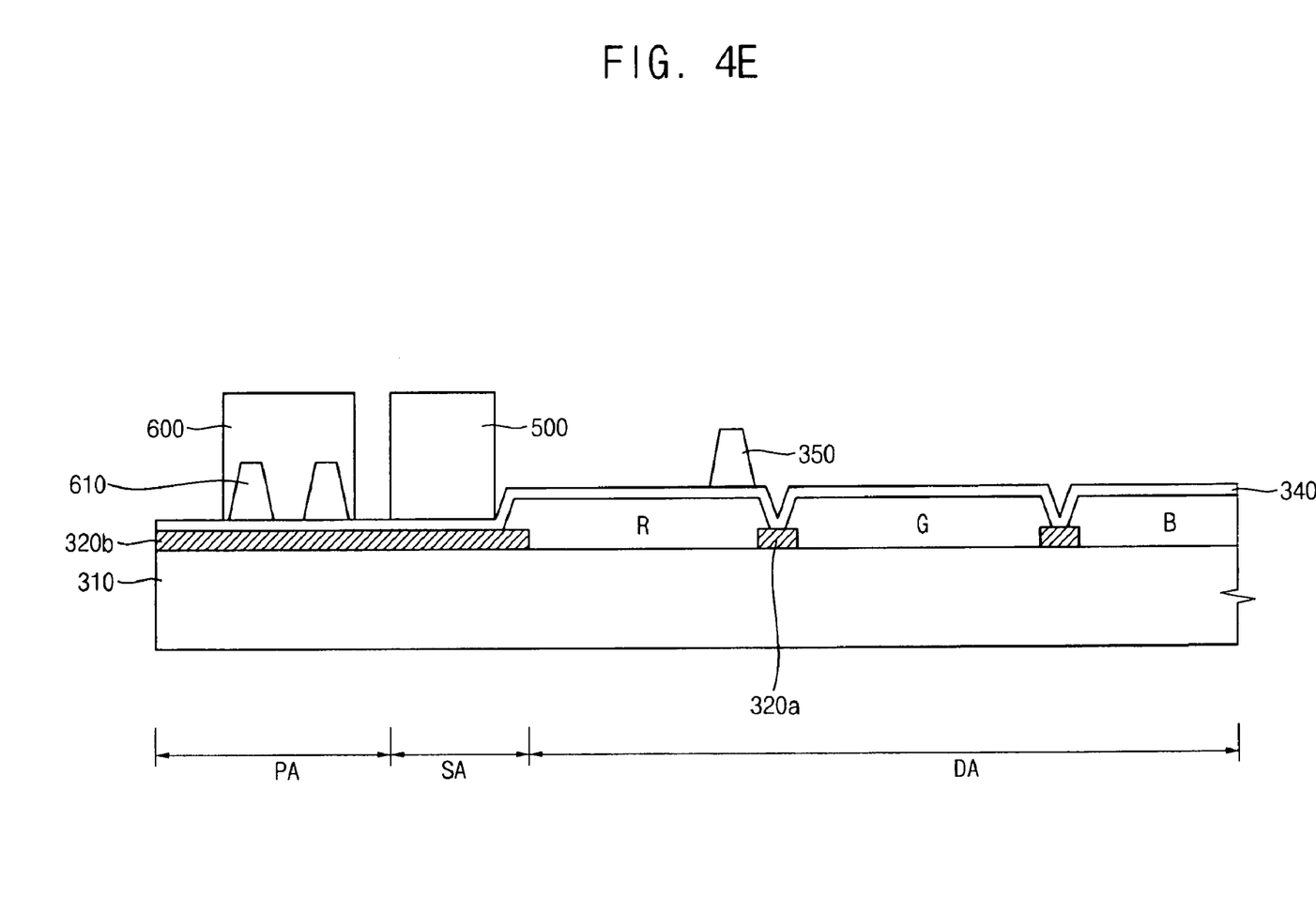

Referring to FIG. 4E, the seal line 500 is formed in the seal line area SA. A paste including a conductive particle is sprayed into the peripheral area PA having the strength-reinforcing member 610 to form the short point 600. The strength-reinforcing member 610 is formed inside the short point 600.

According to the above example embodiment of the present invention, the seal line 610 and the short point 600 are formed on the upper substrate 300. Alternatively, the seal line 610 and the short point 600 may be formed on the lower substrate 300. That is, the paste may be sprayed into the peripheral area PA corresponding to the strength-reinforcing member 610 to form the short point 600.

A manufacturing process of the second substrate 200 is well known. Thus, any further description for the manufacturing process will be omitted. The manufactured upper substrate 300 is placed over the lower substrate 200. Then, a predetermined pressure is applied to the upper and lower substrates 300 and 200, and ultraviolet light is irradiated onto the upper and lower substrates 300 and 200. Thus, the upper and lower substrates 300 and 200 are firmly coupled to each other by the seal line 500. The common voltage electrode pad 250 of the lower substrate 200 and the common electrode 340 of the upper substrate 300 are electrically connected to each other by the short point 600. The strength-reinforcing member 610 formed inside the short point 600 increases the strength of the short point 600.

Figure 5A:
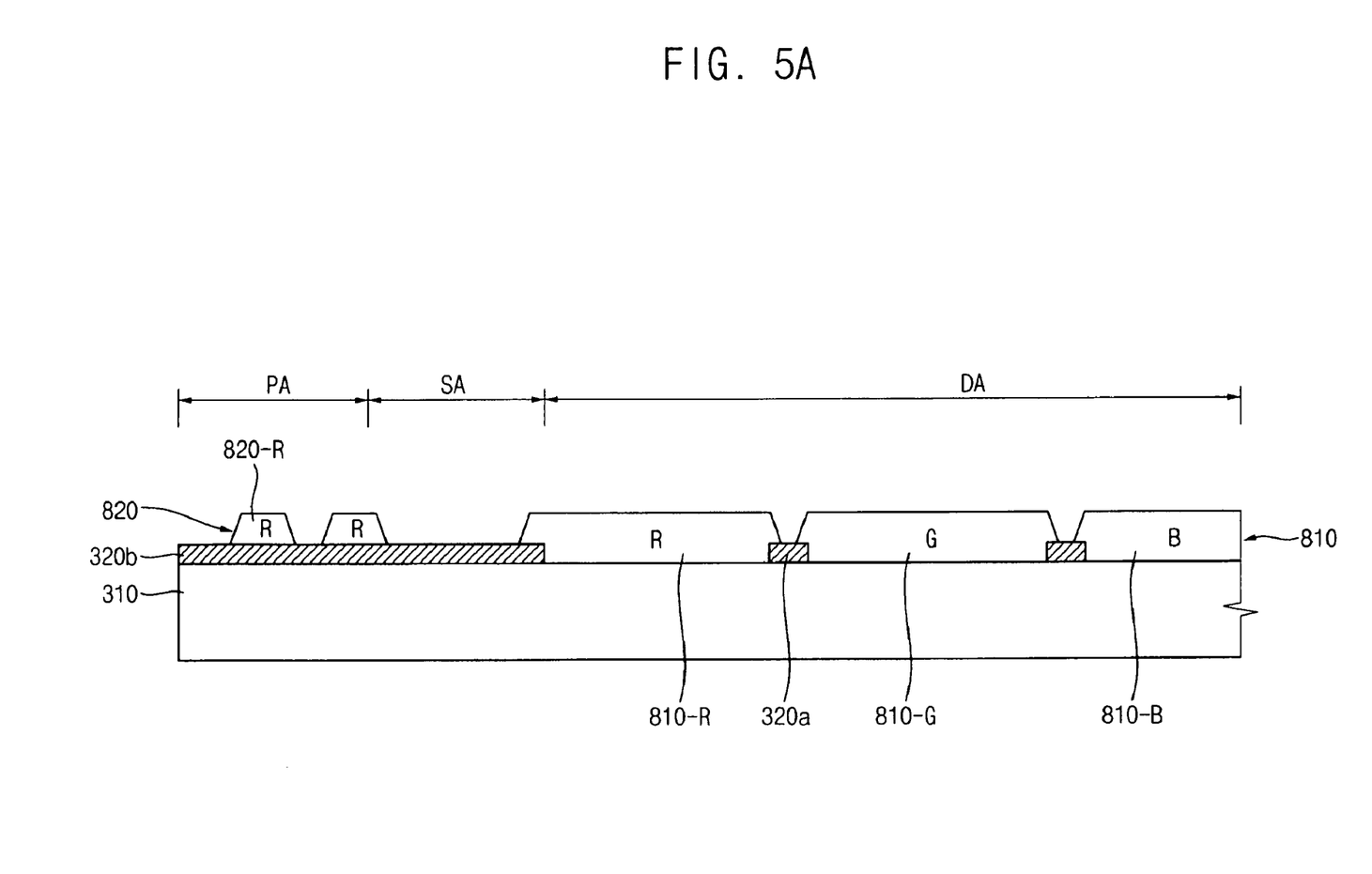

FIGS. 5A to 5D are cross-sectional views illustrating a method of forming the upper substrate of the liquid crystal display panel illustrated in FIG. 3. A process of forming the light-blocking layer 320 on the second substrate 310 is substantially the same as in FIG. 4A. Thus, any further description will be omitted. Referring to FIG. 5A, the color filter 800 is formed on the second substrate 310 having the light-blocking layer 320. The color filter 800 includes the first color filter portion 810 in the display area DA and the second color filter portion 820 in the peripheral area PA.

A first photoresist (not shown) including a red dye or pigment is formed on the second substrate 310 in a uniform thickness. Then, the first photoresist is patterned to form a first red (R) color pixel 810-R in the display area DA and a second red (R) color pixel 820-R in the peripheral area PA. Next, a second photoresist (not shown) including a green dye or pigment is formed on the second substrate 310. Then, the second photoresist is patterned to form a green (G) color pixel 810-G in the display area DA.

Next, a third photoresist (not shown) including a blue dye or pigment is formed on the second substrate 310. Then, the third photoresist is patterned to form a blue (B) color pixel 810-B in the display area DA. Therefore, the first color filter portion 810 including the first R color pixel 810-R, the G color pixel 810-G and the B color pixel 810-B is completely formed on the second substrate 310 in the display area DA.

In addition, the second color filter portion 820 including the second R color pixel 820-R is completely formed on the second substrate 310 in the peripheral area PA. In FIG. 5A, the second color filter portion 820 includes an R color pixel. Alternatively, the second color filter portion 820 may include one of a G color pixel and a B color pixel. Alternatively, the second color filter portion 820 may include at least two of an R color pixel, a G color pixel and a B color pixel.

Figure 5B:
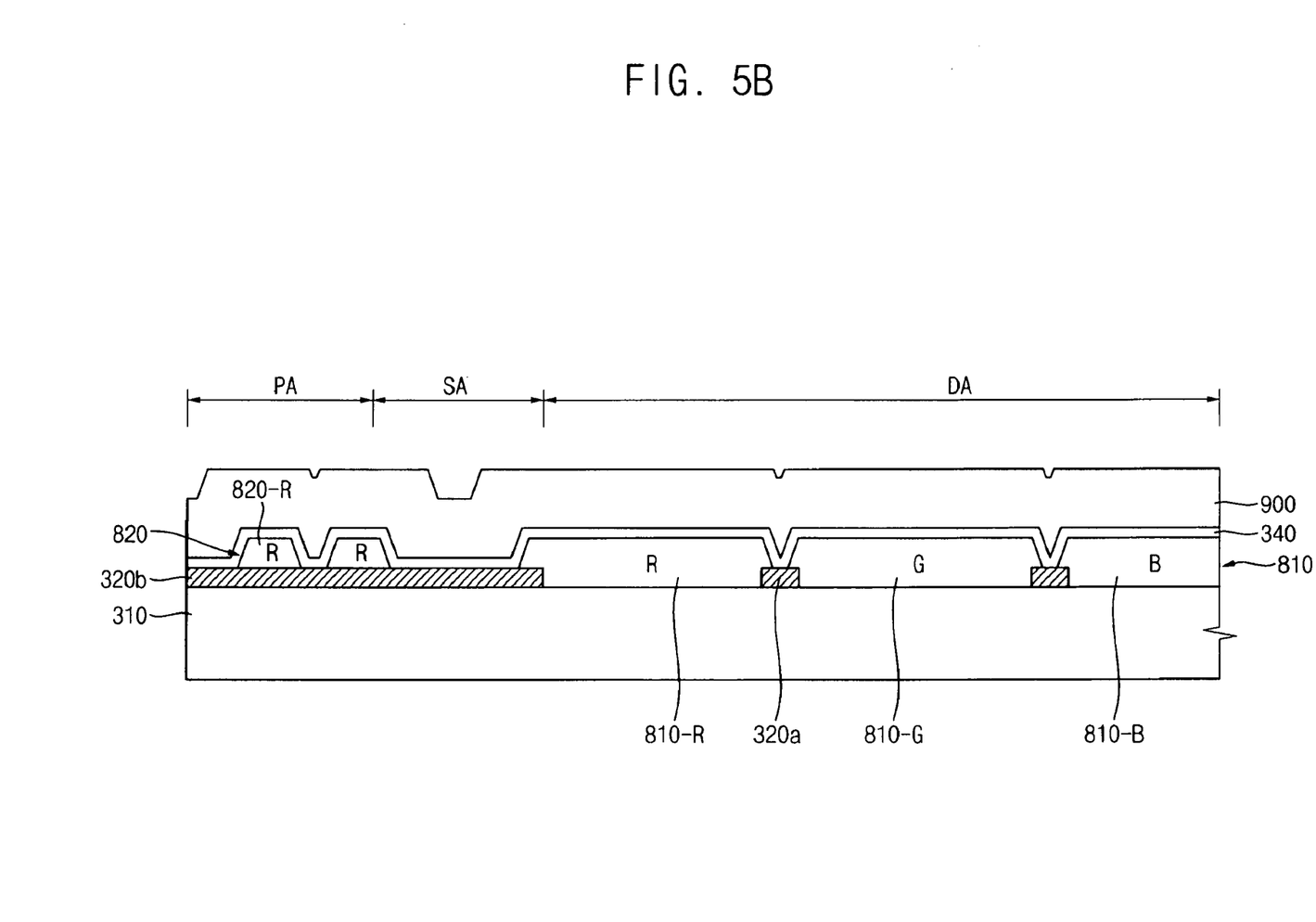

Referring to FIG. 5B, a transparent conductive layer including, for example, ITO or IZO is deposited on the second substrate 310 having the first and second color filter portions 810 and 820 in a uniform thickness to form the common electrode 340. The common electrode 340 faces the pixel electrode 240 of the lower substrate 200. Next, an organic layer 900 is formed on the second substrate 310 having the common electrode 340 in a uniform thickness.

Figure 5C:
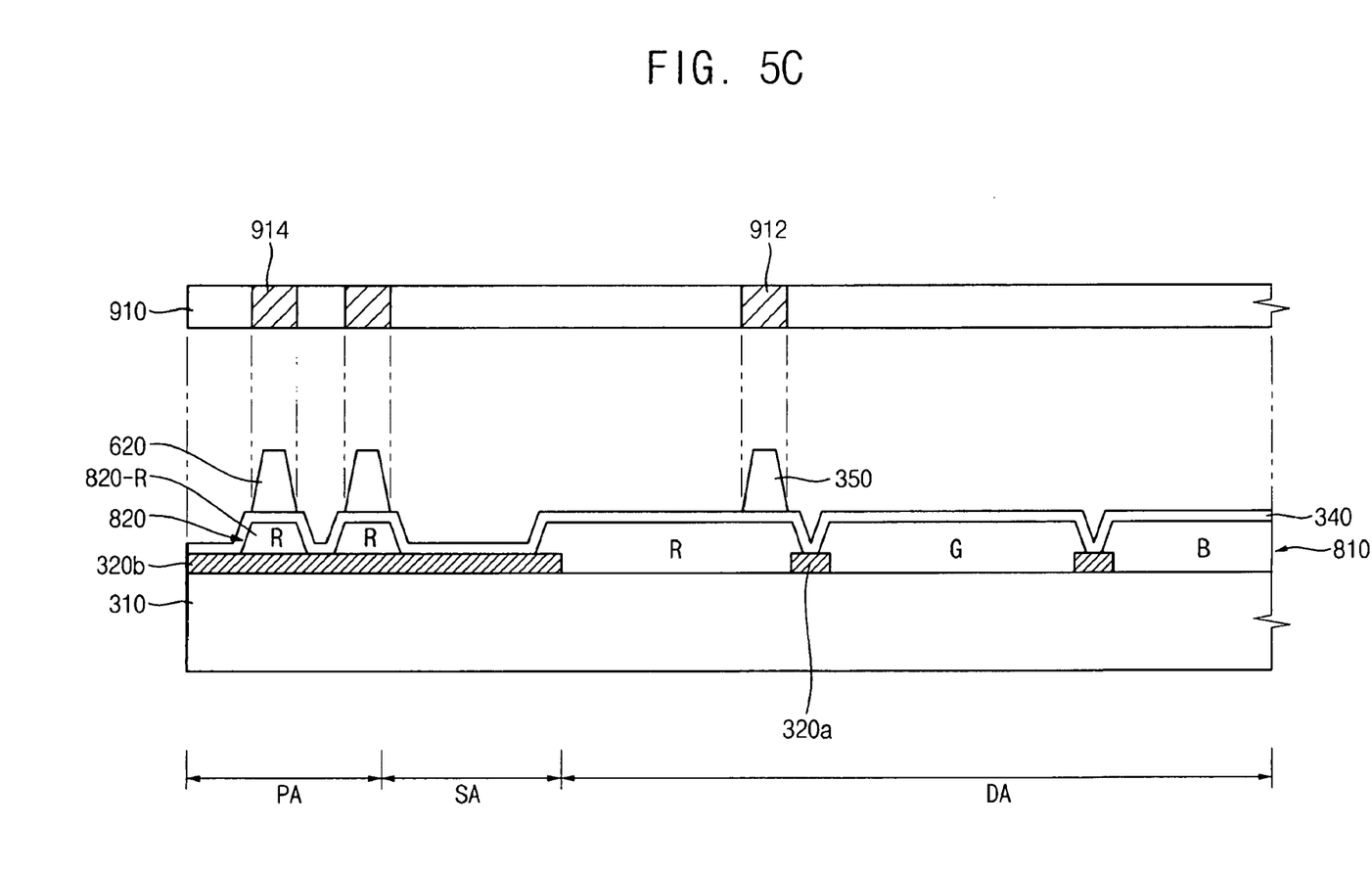

Referring to FIG. 5C, the organic layer 900 is patterned using a mask 910 having a first opening 912 and a second opening 914 to form the column spacer 350 and the strength-reinforcing member 620. The column spacer 350 is formed in the display area DA, and the strength-reinforcing member 620 is formed in the peripheral area PA. The strength-reinforcing member 620 is formed corresponding to an upper portion of the second color filter portion 820.

Figure 5D:
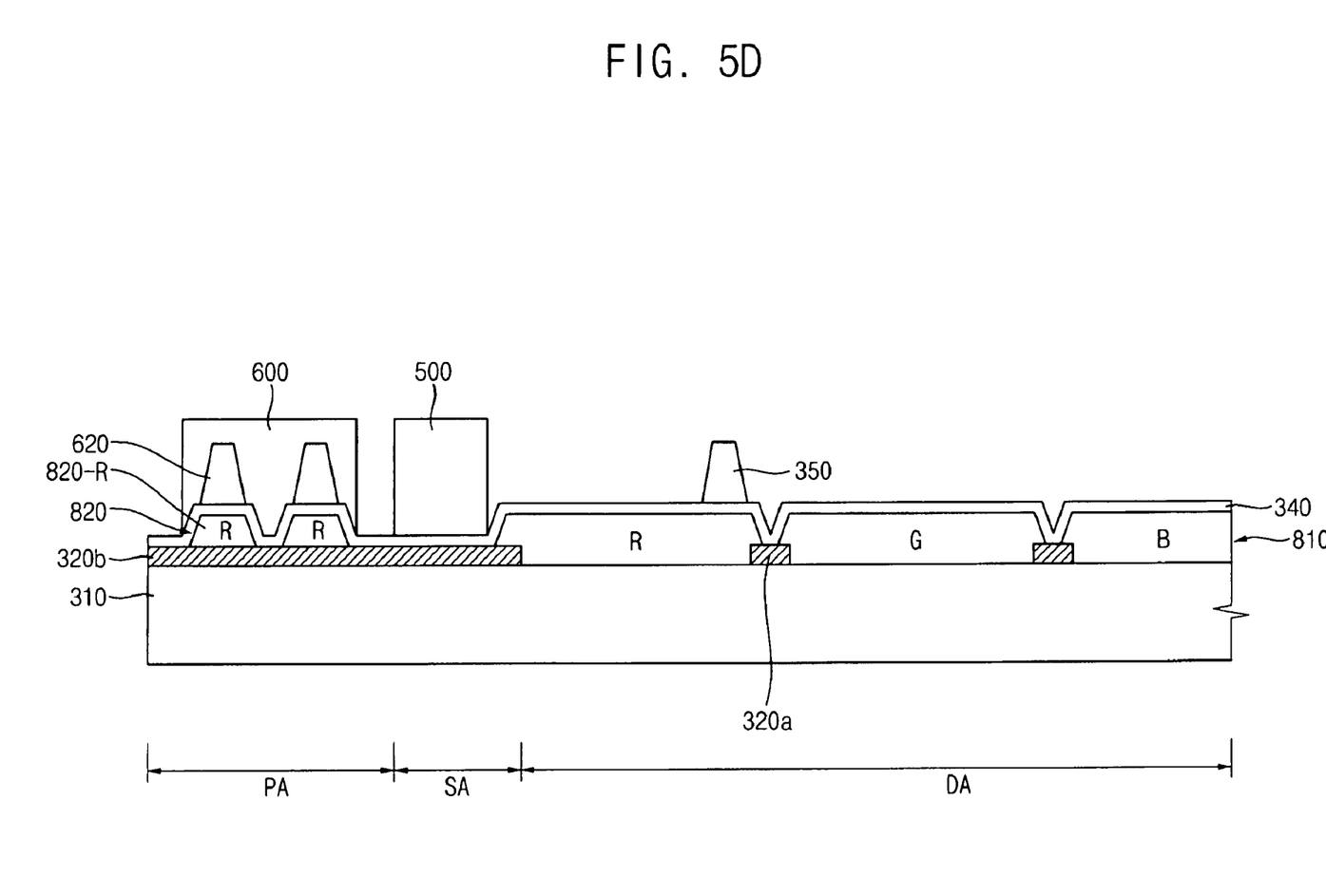

Referring to FIG. 5D, the seal line 500 is formed in the seal line area SA. A paste including a conductive particle is sprayed into the peripheral area PA having the strength-reinforcing member 620 to form the short point 600. The manufactured upper substrate 300 is placed over the lower substrate 200. Then, a predetermined pressure is applied to the upper and lower substrates 300 and 200, and ultraviolet light is irradiated onto the upper and lower substrates 300 and 200. Thus, the upper and lower substrates 300 and 200 are firmly coupled to each other by the seal line 500.

The strength-reinforcing member 620 formed inside the short point 600 increases the strength of the short point 600. Since the strength-reinforcing member 620 is formed on the second color filter portion 820, the position of the strength-reinforcing member 620 becomes high, thereby increasing the strength of the short point 600.

Figure 6:
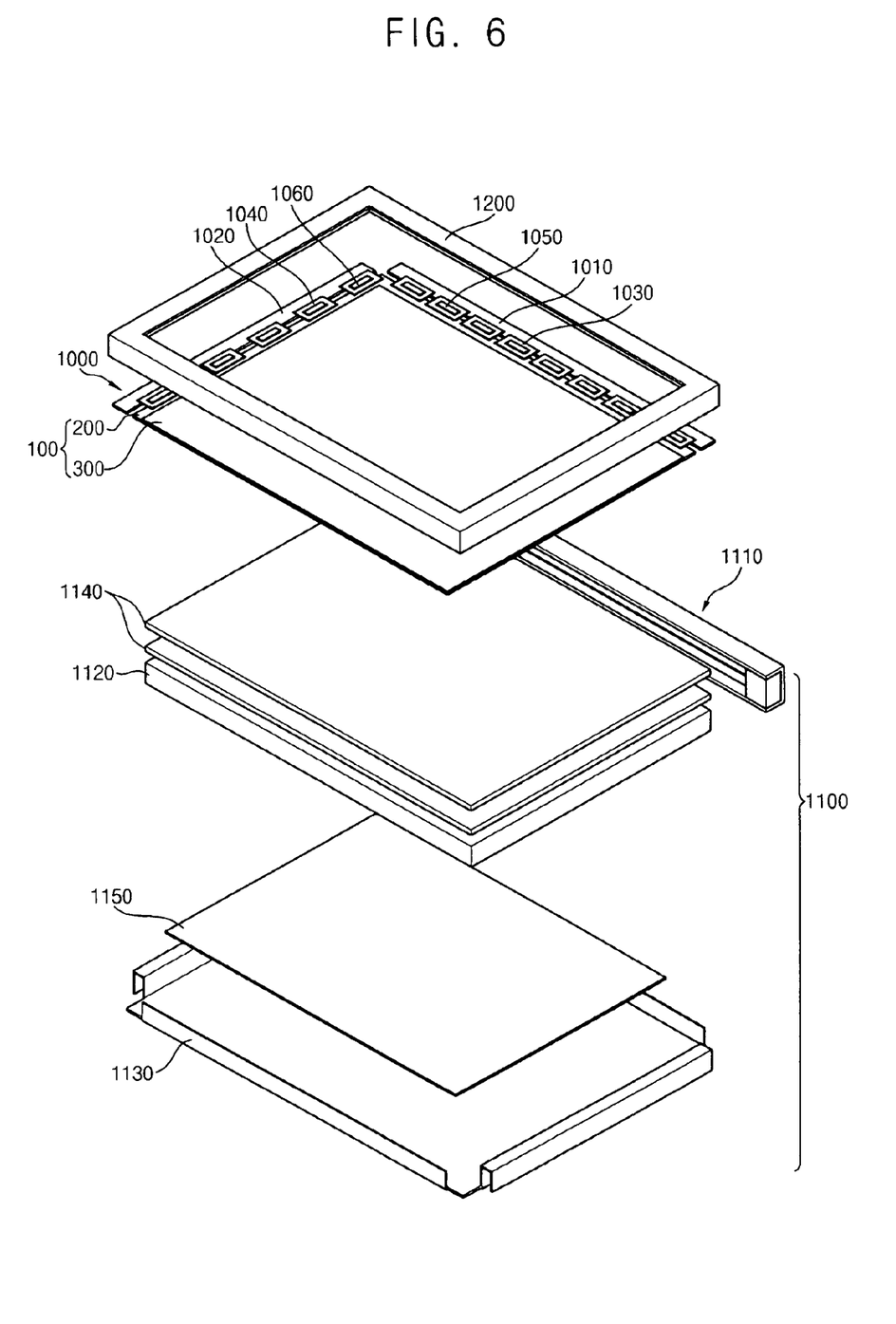
FIG. 6 is an exploded perspective view illustrating a liquid crystal display device according to an example embodiment of the present invention.

FIG. 6 is an exploded perspective view illustrating a liquid crystal display device according to an example embodiment of the present invention. Referring to FIG. 6, the liquid crystal display (LCD) device includes a display unit 1000 and a backlight assembly 1100. The display unit 1000 includes an LCD panel 100, a source printed circuit board (PCB) 1010 and a gate PCB 1020. The source and gate PCBs 1010 and 1020 provide a driving signal for driving the LCD panel 100.

The driving signal provided from the source and gate PCBs 1010 and 1020 is applied to the LCD panel through a data flexible circuit film 1030 and a gate flexible circuit film 1040. For example, a tape carrier package (TCP) or a chip on film (COF) may be employed as the data and gate flexible circuit films 1030 and 1040. The data and gate flexible circuit films 1030 and 1040 include a data driver chip 1050 and a gate driver chip 1060, respectively, to control timing for applying the driving signals provided from the source and gate PCBs 1010 and 1020 to the LCD panel 100.

The LCD panel 100 is substantially the same as the LCD panel 100 shown in FIGS. 1 and 2. Thus, any further description will be omitted. The backlight assembly 1100 includes a lamp unit 1110, a light guiding plate 1120 and a receiving container 1130. The lamp unit 1110 generates light, and the light guiding plate 1120 changes an optical path of the light and guides the light to the LCD panel 100. The receiving container 1130 receives the lamp unit 1110 and the light guiding plate 1120. The backlight assembly 1100 optionally includes an optical sheet 1140 and a light-reflecting plate 1150. The optical sheet 1140 is disposed on or over the light guiding plate 1120 to improve optical characteristics of the light from the light guiding plate 1120. The light-reflecting plate 1150 is disposed under the light guiding plate 1120 to reflect the light leaking from the light guiding plate 1120 toward the display unit 1000.

The receiving container 1130 successively receives the light-reflecting plate 1150, the light guiding plate 1120 and the lamp unit 1110. The optical sheet 1140 is disposed on the light guiding plate 1120, and the LCD panel 100 is disposed on the optical sheet 1140. The source PCB 1110 is bent outside the receiving container 1130, and fixed to a rear surface of the receiving container 1130.

The LCD device may further include a chassis 1200 disposed on the LCD panel 100. The chassis 1200 is combined with the receiving container 1130 to fasten the LCD panel 100 to the receiving container 1130. According to the above-mentioned example embodiment of the present invention, the LCD device includes the strength-reinforcing member 610 formed inside the short point 600 to increase the strength of the short point 600. The strength-reinforcing member 610 is simultaneously formed with the column spacer 350, and has substantially the same material as the column spacer 350.

In addition, the LCD device may include the strength-reinforcing member 620 formed on the second color filter portion 820 in the peripheral area PA so that the position of the strength-reinforcing member 620 is heightened. Thus, the strength of the short point 600 increases.

According to the present invention, a display panel includes a strength-reinforcing member formed inside a short point. The strength-reinforcing member is simultaneously formed with a column spacer, and has substantially the same material as the column spacer. In addition, the strength-reinforcing member may be disposed on a color filter portion in a peripheral area. Thus, the strength-reinforcing member formed inside the short point increases the strength of the short point. Therefore, since the strength of the short point is increased to prevent the short point of the LCD panel from being cracked due to a stress after an upper substrate and a lower substrate are combined to form the LCD panel. Thus, electrical connection between the upper substrate and the lower substrate may be stabilized, thereby improving display quality of a display device having the display panel. In addition, the strength-reinforcing member is simultaneously formed with the column spacer so that manufacturing process may be simplified.

Although example embodiments of the present invention have been described, it is understood that the present invention should not be limited to these example embodiments but various changes and modifications can be made by one ordinary skilled in the art within the spirit and scope of the present invention as hereinafter claimed.

What is claimed is:

1. A display panel comprising:
   a first substrate;
   a second substrate facing the first substrate, the second substrate comprising a display area and a peripheral area surrounding the display area;
   a connecting member disposed in the peripheral area to electrically connect the first substrate and the second substrate to each other; and a strength-reinforcing member protruding from the second substrate and disposed inside the connecting member.

2. The display panel of claim 1, further comprising a cell gap maintaining member disposed between the first and second substrates to maintain a gap between the first and second substrates.

3. The display panel of claim 2, wherein the strength-reinforcing member comprises substantially the same material as the cell gap maintaining member.

4. The display panel of claim 1, further comprising:
a first color filter disposed in the display area of the second substrate; and
a second color filter disposed between the strength-reinforcing member and the second substrate.

5. The display panel of claim 4, wherein the first color filter comprises a first color pixel, a second color pixel and a third color pixel, and the second color filter comprises at least one of the first color pixel, the second color pixel and the third color pixel.

6. The display panel of claim 1, wherein the first substrate comprises a common voltage electrode pad formed corresponding to the connecting member to apply an externally provided common voltage to the connecting member.

7. The display panel of claim 6, wherein the second substrate further comprises a common electrode configured to receive the common voltage from the connecting member.

8. A display panel comprising:
a first substrate;
a second substrate facing the first substrate, the second substrate comprising a display area and a peripheral area surrounding the display area;
a connecting member disposed in the peripheral area to electrically connect the first substrate and the second substrate to each other;
a cell gap maintaining member disposed between the first and second substrates to maintain a gap between the first and second substrates; and
a strength-reinforcing member protruding from the second substrate and disposed inside the connecting member, the strength-reinforcing member comprising substantially the same material as the cell gap maintaining member.

9. A display panel comprising:
a first substrate;
a second substrate facing the first substrate, the second substrate comprising a display area and a peripheral area surrounding the display area, the second substrate having a first color filter disposed in the display area and a second color filter disposed in the peripheral area;
a connecting member disposed in the peripheral area to electrically connect the first substrate and the second substrate to each other;
a cell gap maintaining member disposed between the first and second substrates to maintain a gap between the first and second substrates; and
a strength-reinforcing member protruding from the second color filter and disposed inside the connecting member, the strength-reinforcing member comprising substantially the same material as the cell gap maintaining member.

10. A method of manufacturing a display panel, comprising:
forming a first substrate;
forming a second substrate facing the first substrate, the second substrate comprising a display area and a peripheral area surrounding the display area;
forming a strength-reinforcing member protruding from the second substrate corresponding to the peripheral area; and
forming a connecting member in the peripheral area so as to receive the strength-reinforcing member inside the connecting member, the connecting member electrically connecting the first substrate and the second substrate to each other.

11. The method of claim 10, further comprising forming a cell gap maintaining member between the first and second substrates, the cell gap maintaining member corresponding to the peripheral area.

12. The method of claim 11, wherein the strength-reinforcing member comprises substantially the same material as the cell gap maintaining member.

13. The method of claim 10, wherein forming the second substrate further comprising:
forming a first color filter in the display area of the second substrate; and
forming a second color filter in the peripheral area of the second substrate, the second color filter corresponding to the strength-reinforcing member.

14. The method of claim 13, wherein the first color filter comprises a first color pixel, a second color pixel and a third color pixel, and the second color filter comprises at least one of the first color pixel, the second color pixel and the third color pixel.

15. A display device comprising:
a light generating unit configured to generate light; and
a display panel comprising:
a first substrate;
a second substrate facing the first substrate, the second substrate comprising a display area where an image is displayed using the light and a peripheral area;
a connecting member disposed in the peripheral area to electrically connect the first substrate and the second substrate to each other; and
a strength-reinforcing member protruding from the second substrate and disposed inside the connecting member.

* * * * *